US008401806B2

(12) United States Patent
Borsting et al.

(10) Patent No.: US 8,401,806 B2
(45) Date of Patent: Mar. 19, 2013

(54) METHOD FOR THE DETECTION OF ERRORS IN PUMP UNITS

(75) Inventors: Hakon Borsting, Stovring (DK); Flemming Munk, Viborg (DK)

(73) Assignee: Grundfos Management a/s, Bjerringbro (DK)

( * ) Notice: Subject to any disclaimer, the term of this patent is extended or adjusted under 35 U.S.C. 154(b) by 534 days.

(21) Appl. No.: 12/532,284

(22) PCT Filed: Feb. 23, 2008

(86) PCT No.: PCT/EP2008/001449

§ 371 (c)(1),
(2), (4) Date: Sep. 21, 2009

(87) PCT Pub. No.: WO2008/116538

PCT Pub. Date: Oct. 2, 2008

(65) Prior Publication Data

US 2010/0082275 A1 Apr. 1, 2010

(30) Foreign Application Priority Data

Mar. 23, 2007 (EP) .................................... 07005995

(51) Int. Cl.
*G01F 17/00* (2006.01)

(52) U.S. Cl. ........................................................ 702/56

(58) Field of Classification Search .................... 702/56, 702/35, 34, 39, 185, 145

See application file for complete search history.

(56) References Cited

U.S. PATENT DOCUMENTS

| | | | | |
|---|---|---|---|---|
| 5,825,657 | A * | 10/1998 | Hernandez | 702/182 |
| 6,260,004 | B1 * | 7/2001 | Hays et al. | 702/183 |
| 7,031,873 | B2 | 4/2006 | Song | |
| 2008/0234964 | A1 * | 9/2008 | Miyasaka et al. | 702/113 |
| 2009/0222228 | A1 * | 9/2009 | Gao et al. | 702/67 |

FOREIGN PATENT DOCUMENTS

| | | | |
|---|---|---|---|
| DE | 3520734 | A1 | 12/1986 |
| GB | 2 298 239 | A | 8/1996 |
| WO | 97/08459 | A1 | 3/1997 |
| WO | 2006/127939 | A2 | 11/2006 |

OTHER PUBLICATIONS

Translation of DE 3520734 A1, Dec. 11, 1986.*

* cited by examiner

*Primary Examiner* — Edward Raymond

(74) *Attorney, Agent, or Firm* — Panitch Schwarze Belisario & Nadel LLP

(57) ABSTRACT

A method is provided for detecting faults in a pump assembly having an electric motor, or faults in an electric motor, having at least one rotating shaft. A vibration signal is detected, the detected vibration signal is processed in a manner such that the influence of the current rotational speed of the shaft is eliminated, periodic signals are filtered out of the processed vibration signal, and the vibrational operating condition, in particular possible faults, is recognized by way of the periodic signals. Further, a pump assembly having an electric motor or an electric motor is provided in which this method is applied.

16 Claims, 4 Drawing Sheets

METHOD FOR THE DETECTION OF ERRORS IN PUMP UNITS

CROSS-REFERENCE TO RELATED APPLICATIONS

This application is a Section 371 of International Application No. PCT/EP2008/001449, filed Feb. 23, 2008, which was published in the German language on Oct. 2, 2008, under International Publication No. WO 2008/116538 A1 and the disclosure of which is incorporated herein by reference.

BACKGROUND OF THE INVENTION

The invention relates to a method for detecting faults in a pump assembly having an electric motor, or faults in an electric motor.

Different faults, in particular bearing damage, may occur in pump assemblies which are driven by electric motors, or also in electric motors themselves, or also damage to impellers or contamination may occur in the pump assemblies. It is desirable to be able to detect these faults as early as possible, in order to be able to exchange such an assembly or to overhaul it in good time, before a complete failure of the assembly occurs.

BRIEF SUMMARY OF THE INVENTION

With regard to this problem, it is an object of the invention to provide a method as well as corresponding devices, with which different faults in a pump assembly having an electric motor or faults in an electric motor may be detected in a reliable and simple manner.

This object is achieved by a method for detecting faults in a pump assembly having an electric motor or in an electric motor having at least one rotating shaft, comprising detecting a vibration signal and processing the vibration signal in a manner such that the influence of the current rotational speed of the shaft is eliminated, periodic signals are filtered out of the processed signal, and the vibrational operating condition, in particular possible faults, is recognized by way of the periodic signals.

The object is further achieved by a pump assembly having an electric motor or an electric motor having at least one rotating shaft, comprising a fault detection system having at least one vibration sensor and an evaluation device connected to the vibration sensor, wherein the evaluation device is provided with a processing module designed for eliminating the influence of the current rotational speed of the shaft from a vibration signal captured by the vibration sensor, by a filter module designed for filtering periodic signals out of the vibration signal processed by the processing module, and a recognition module designed for recognizing the vibrational operating condition by way of the periodic signals.

The method according to the invention serves for detecting faults in a pump assembly, which comprises an electric motor for the drive, or faults in an electric motor. These assemblies always comprise at least one rotating shaft. This shaft is mounted in bearings, in which for example faults may occur, as may also be detected by the method according to the invention.

For fault detection, a vibration signal is detected in the electric motor or in the case of a pump assembly, in the pump assembly or, as the case may be, in its drive motor. Known sensors for vibration detection may be applied for this. The detected vibration signal is subsequently processed in a first working step, in a manner such that the influence of the current rotational speed of the shaft is eliminated. In this manner, the processed signal is independent of the rotational speed, so that different operating conditions, in particular fault types, may be recognized independently of the current rotation speed. The processing for eliminating the influence of the rotational speed is preferably effected in a manner such that the sampling frequency is multiplied by the current rotational speed and divided by a constant rotational speed value, whereby the sampling frequency is related practically to this constant rotational speed value, so that the further frequency analysis may be carried out without the influence of the current rotational speed. The vibration signal may be filtered in a low-pass, for example in a Butterworth filter of the 20th order with a limit frequency of 40% of the processed sampling frequency, before the processing, in order to avoid an aliasing effect. The processing of the vibration signal, as the case may be, is effected after running through the low pass filter, by resampling or changing the sampling rate with the sampling rate related to the constant rotational speed. The resampling may, for example, be effected by filtering the time-discrete signal while using a non-causal sine function as an impulse response function.

The required rotational speed of the shaft may be determined in various known manners, for example by shaft encoders or also directly from the vibration signal in the sense of a virtual rotational speed sensor, as is disclosed, for example, in U.S. Pat. No. 7,031,873 B2. For example, the rotational speed signal may be detected from the vibration signal also by downsampling or scanning rate reduction to 128 Hz and subsequent evaluation of the ten greatest swings of the spectrum for each time window. The greatest swings of the current time window are applied over those of the subsequent time window within certain limits. One subsequently draws a course of the rotational speed based on agreement of the swings.

The vibration signal processed in this manner is subsequently subjected to a filtering, with which periodic signals are filtered out of the processed vibration signal. Then the operating condition of the pump assembly or of the electric motor, with regard to vibration, may be recognized by these periodic signals. In particular, it is possible to recognize such operating conditions with regard to vibration, from which one may conclude faults, for example bearing faults. The periodic signals may, for example, be recognized in a manner such that the amplitude of certain characteristic signals, in particular characteristic fault signals, is detected, and subsequently the time intervals between these amplitudes are measured. Then, on the basis of the time intervals between the amplitudes, one may ascertain wherever it is here the case of periodic signals or not.

The processed vibration signal is subjected to a Cepstral analysis, preferably in a direct manner, for filtering out the periodic signals or signal parts. This means that no further transformations or evaluations of the vibration signal are carried out before the Cepstral analysis. The operating condition or possible faults are subsequently recognized by the Cepstral diagram produced by the Cepstral analysis. Certain operating conditions are distinguished by certain characteristics in the Cepstral diagram, from which faults may be particularly recognized.

With regard to the Cepstral analysis, it is the case of a double frequency analysis, i.e., the result of a frequency analysis is subjected once again to a frequency analysis. Thereby, periodic signal parts are filtered out or extracted from the vibration signal.

A short-time Cepstral analysis of the spectrogram of the vibration signal may be carried out by carrying out a frequency analysis in the frequency domain, as a Cepstral analysis or Cepstral transformation. In order to eliminate influences of the motor design, a high-pass filtering of the frequency domain may be carried out before carrying out the Fourier transformation of the frequency domain. The Cepstral domain resulting from this then preferably contains only bearing influences and no motor influences.

The evaluation of the Cepstral diagram for the recognition of the operating conditions or faults is preferably effected by a pattern recognition, with which one takes in particular account, at which locations swings occur in the Cepstral diagram. That is, here, the recognition is preferably carried out by the distribution or position of individual swings in the Cepstral diagram, and less by the absolute values of the swings. One succeeds in the characteristic noise of the electric motor or pump assembly being largely eliminated and being separated from the periodic signals by the implemented Cepstral analysis, with which a frequency transformation of a Fourier spectrogram is carried out. One may then recognize a certain operating condition and in particular deduce the type of fault, by distribution of the signals or their position in the Cepstral diagram, in particular by the periodic repetition rate of individual signals.

Particularly preferably, the operating conditions are recognized by previously known patterns in the periodic signals and in particular in the Cepstral diagram. That is, for certain fault types, e.g. the patterns of the occurring signals, i.e. the position and distribution of individual swings, are known. One may then deduce certain operating conditions or known fault types by the comparison of the current signal pattern or of the Cepstral diagram with known patterns. Thereby, previously known patterns may be used for recognizing operating conditions in two ways. On the one hand, it is possible for the previously known patterns to correspond to certain operating conditions to be recognized and to certain fault types, so that one may recognize when such a pattern or similar pattern occurs, and one may then conclude that indeed such an operating condition or fault is present. Alternatively, it is also conceivable for the previously known patterns to correspond to desired, i.e., in particular fault-free operating conditions, and a comparison is carried out in a manner such that undesired operating conditions may be recognized by the fact that patterns which do not correspond to the previously known patterns, occur in the current periodic signals or in the Cepstral diagram.

The previously known patterns may be stored into control electronics of a pump assembly or an electric motor, on the part of the factory. Alternatively or additionally, it is however also conceivable for the patterns which correspond to certain operating conditions, in particular fault-free nominal operating conditions, e.g. on starting operation of the pump assembly or of the electric motor for the first time, to be automatically detected by the control electronics or regulation electronics. Thereby, one then preferably assumes that the pump assembly or the electric motor functions in a fault-free manner after delivery and with the first starting operation.

Further preferably, the recognition of operating conditions, in particular faults, is effected in selected sections of the Cepstral diagram, wherein it is preferably the case of predefined sections. That is, for the recognition, in particular pattern recognition, one does not observe the complete Cepstral diagram, but only a relevant section. For this, one may consider predefined details, in which usually certain characteristic signals at certain operating conditions, in particular faults, occur. In order to be able to recognize these certain operating conditions, it is then not necessary to evaluate the complete Cepstral diagram or Cepstrum. Thus detail enlargements take place.

The recognition of vibrational operating conditions or faults by the Cepstral diagram is effected further preferably by a neural network and/or a fuzzy logic. An intelligent evaluation is possible by this, which also takes into account variants of previously known operating conditions and may adapt to external influence factors.

It is further preferable, after the Cepstral analysis and before the recognition of operating conditions, to allow a normalization of the Cepstral diagram to take place in a manner such that the swings in the diagram are set in relation to the background noise. Thus, the evaluation may be adapted to different pumps or electric motor types, which have different noise levels or different background noises. A uniform evaluation for different pumps or motor types may be carried out due to the fact that the swings or signals are set in relation to these background noises, since the evaluation is effected independently of the current noise level.

The object of the invention is further achieved by a pump assembly having an electric motor or by an electric motor, into which a device for carrying out fault detection according to the previously described method is integrated.

Such a pump assembly, for its drive, comprises an electric motor. The electric motor or the pump assembly comprises at least one rotating shaft, about which, with a motor, the rotor rotates, or via which, with a pump assembly, at least one impeller is driven. According to the invention, a fault detection system is integrated into the pump assembly or into the electric motor. This may comprise its own electronics or have separate electronic components, but may also be integrated into electronic components, in particular microprocessors, which are present in any case for the control or regulation (closed loop control) of the pump assembly or of the electric motor, or use these.

The fault detection system comprises at least one vibration sensor and an evaluation device connected to the vibration sensor, wherein the evaluation device is preferably formed by one or more microprocessors. The evaluation device is provided with a processing module, which is designed in order to eliminate the influence of the current rotational speed of the shaft from a vibration signal detected by the sensor. This may be effected in the manner described above by the method, by the sampling rate being related to a constant rotational speed, and the vibration signal then being processed or resampled to this sampling rate. For this, the processing module comprises predefined computation structures, which may carry out the respective computations.

The fault detection system moreover comprises a filter module, which is designed such that it may filter out or extract periodic signals from the vibration signal processed in the processing module. Moreover, a recognition module is provided, which is designed in order to be able to recognize the vibrational operating condition of the pump assembly or of the electric motor by the filtered-out periodic signals or signal components. Thereby, an automatic recognition of certain operating conditions with regard to the vibrations occurring in the assembly is carried out in the recognition module by characteristic periodic signals. In particular, operating conditions may be recognized, which may conclude a faulty operation, for example a bearing damage.

The evaluation device preferably comprises a Cepstral analysis module as a filter module, which is designed for carrying out a Cepstral analysis or Cepstral transformation on the vibration signal processed by the processing module, in the manner described above. The Cepstral analysis module is a computer unit or a software component, which carries out the Cepstral transformation or analysis of the vibration signal. As the case may be, as described above, low-pass and/or high-pass filters may yet be integrated in front of the processing module or the Cepstral analysis module, in order to eliminate disturbing signal influences.

Moreover, the evaluation device preferably comprises a recognition module, which is designed for the recognition of operating conditions or faults by the Cepstral diagram produced by the Cepstral analysis module. The recognition module may likewise be a hardware component and/or software component of the processing module, which is designed for a corresponding evaluation of the Cepstral diagram. Thereby, the recognition module is designed such that it may recognize different operating conditions or faults from the Cepstral diagram, in the manner described above by the method.

Preferably, the recognition module comprises a fuzzy logic and/or a neural network in order to carry out the recognition by the Cepstral diagram. An artificial intelligence may be provided by these structures, which permits the recognition of different patterns in the Cepstral diagram, which are characteristic of individual operating conditions, also those patterns which possibly deviate from previously known patterns. Such a system may automatically react to changed constraints.

Preferably, the evaluation device comprises a memory module, in which patterns which are characteristic of certain operating conditions, of a periodic signal, in particular of a Cepstral diagram or of details of a Cepstral diagram, are stored, and the recognition module is designed for the recognition of certain operating conditions by the periodic signal or Cepstral diagram, by the stored patterns. The memory module may be a separate memory component, but memory components which are present in any case in a control device of the pump assembly or the electric motor, may also be used. The recognition module compares the current signal patterns or Cepstral diagrams or details from these, with the previously known and stored patterns, and recognizes the respective operating conditions as soon as it ascertains an identity or similarities to the known patterns. Then a notice, in particular a fault notification, may be outputted via an output device. For this, for example a warning lamp may be attached to the electric motor or to the pump assembly. A fault code or a fault description may be outputted in a clear message in a display. It is also conceivable to transmit the fault type to an external evaluation device, for example to a remote control, in order here to be able to carry out a more detailed fault evaluation.

One may on the one hand store a pattern in the memory module, which corresponds to undesired operating conditions, for example characteristic faults. If the recognition module recognizes a corresponding pattern in the current signal, then it may therefore deduce such an undesirable operating condition. On the other hand, it is alternatively or additionally possible to store patterns in the memory module, which correspond to nominal operating conditions, in particular fault-free operating conditions. Here, the recognition of undesirable operating conditions may be effected in exactly the opposite manner, by recognizing an undesired operating condition by the current signal pattern deviating from the previously known stored pattern.

The patterns may be stored in the memory module on the part of the factory. Alternatively or additionally, it is also possible, however, to provide the fault detection system with a calibration module, which is designed for detecting the previously known patterns to be stored. The calibration module may, for example, be designed in a manner such that it detects the operating condition with regard to vibrations or various operating conditions with regard to vibrations, on starting operation, in particular with the first starting operation of the assembly, i.e., of the pump assembly or of the electric motor, and storing the aforementioned conditions in the memory module as previously known patterns. Thereby, it is assumed that the assembly is essentially fault-free with the first starting operation. Moreover, the calibration module may also be designed such that it may store patterns in later operation of the assembly. Thus, for example, it is conceivable for the calibration module to be able to be activated, in order to store previously known patterns after a repair of the assembly, when it operates in a fault-free manner.

The vibration sensor is preferably arranged on the mechanical structure of the pump assembly or of the electric motor, in a terminal box, within an arrangement of electronic components and/or in a fluid conduit for a fluid to be delivered by the pump assembly. Thus, depending on the type of vibration to be detected, for example a bearing fault or impeller fault with a pump assembly, there may be other preferred installation locations for one or more vibration sensors, in order to be able to detect the respective vibration particularly well. Vibrations are transmitted particularly well via the mechanical structure and may thus be detected well there. The arrangement of a vibration sensor within an arrangement of electronic components or in a terminal box has the advantage that the cabling and assembly are simplified. If the vibration sensor is arranged together with other electronic components, for example a control device or a frequency converter, in a terminal box, one may make do without integrating additional sensors into the assembly and then wiring these with control components or display components in the terminal box. Moreover, the sensor may be arranged in the terminal box in a protected manner. As a whole, the assembly is considerably simplified, since the sensor in the ideal case may be placed together with the other electronic components on a circuit board. The vibration detection in a fluid delivered by a pump assembly may also be very advantageous, since for this a pressure sensor, possibly required in any case, may be applied, which immerses into the fluid. For example, the impeller, but as the case may be, also bearing faults, are transmitted as vibrations onto the fluid to be delivered, and here may also be detected indirectly in the fluid by an adequately suitable sensor.

According to a further preferred embodiment, the signal transmission between the vibration sensor and evaluation device is effected in a wireless manner, particularly preferably via radio. In this manner, the sensor may be very simply placed in the electric motor or pump assembly, wherein the arrangement is preferably selected according to where the vibrations required for evaluation may be detected best of all. One does not have to pay attention with regard to the cabling. The vibration sensor for the energy supply may be provided with a battery, but it is also conceivable, however, for the required electrical energy to be provided in the vibration sensor itself by energy conversion, for example of the vibration energy or heat energy.

Further preferably, the evaluation device comprises a normalization module, which is designed for normalizing the Cepstral diagram produced by the Cepstral analysis module, the normalization being effected in a manner such that the swings in the diagram are set in relation to the background noise, as described above. This normalization module may be integrated into the fault detection system as a hardware component, but also provided in this as a pure software component.

It is to be understood that the fault detection system as a whole may be constructed by separate hardware components which provide the described functions. Here, however, it is also conceivable for all or individual functions or modules of the fault recognition system to be designed as software components, which are carried out in a computation unit which comprises a microprocessor. For this, one may provide a separate computation unit, but it is also conceivable for the software components to be integrated into a computation unit, which simultaneously assumes other functions in the electric motor or pump assembly, for example controls or regulates (closed-loop control) these.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Hereinafter, the basic procedure of the method according to one preferred embodiment of the invention is described with reference to FIG. 1.

Figure 1:
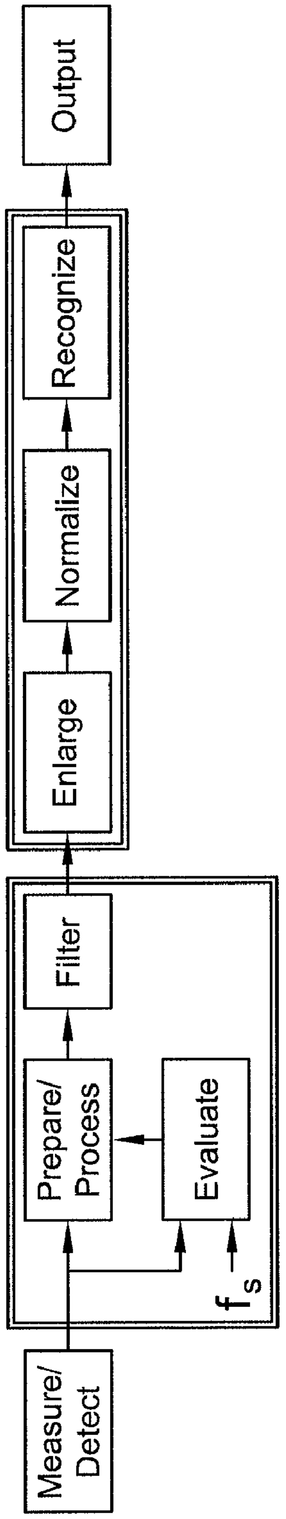
FIG. 1 is a procedural block diagram showing the procedure of the method according to an embodiment of the invention.

In step 1 in FIG. 1, a vibration measurement or a vibration signal detection takes place by a suitable sensor, for example an acceleration sensor, an optical sensor, a microphone or hydrophone. The output signal of this sensor or of the vibration measurement is provided for the steps 2 and 3. In step 2, a signal preparation or signal processing is effected, in which the influence of the current rotational speed of the motor shaft or of the pump impeller is minimized or eliminated, depending on the apparatus into which the fault recognition system according to the invention is integrated. This processing of the vibration signal is effected by a resampling with a sampling frequency, which is related to a constant predefined rotational speed. For this, the current sampling frequency is multiplied by the current rotational speed and divided by a constant rotational speed, for example 3000 r.p.m. A new sampling rate is formed in this manner, with which the resampling or the change of the sampling rate is carried out on the vibration signal. In this manner, the vibration signal at this constant rotational speed appears to have been recorded, so that the subsequent evaluation is independent of the current motor rotational speed. The vibration signal is moreover filtered by a low-pass before the resampling is carried out, in order to avoid an aliasing effect.

The required rotational speed signal is led to the processing step 2 via step 3. The rotational speed signal may be detected in a direct manner ($f_s$) by suitable measurement probes, or for example in step 3, may also be evaluated directly from the detected vibration signal as is described for example in U.S. Pat. No. 7,031,873.

After processing the vibration signal, in step 4 a filtering is carried out in the form of a Cepstral analysis or Cepstral transformation, in order to extract periodic signals or signal components from the vibration signal. Such a Cepstral analysis includes a Fourier transformation, wherein the Fourier spectrogram is subjected to a frequency analysis in the frequency domain. The advantage of such a Cepstral analysis lies in the fact that the characteristic noise of the motor or of the pump assembly is set toward zero and thus may be separated from a periodic signal.

With the Cepstral analysis, a high-pass filtering of the frequency domain is carried out before the Fourier transformation of the frequency domain, in order to exclude influences of the motor design. The resulting Cepstral domain then essentially no longer has any influences of the motor noise.

Figure 5:
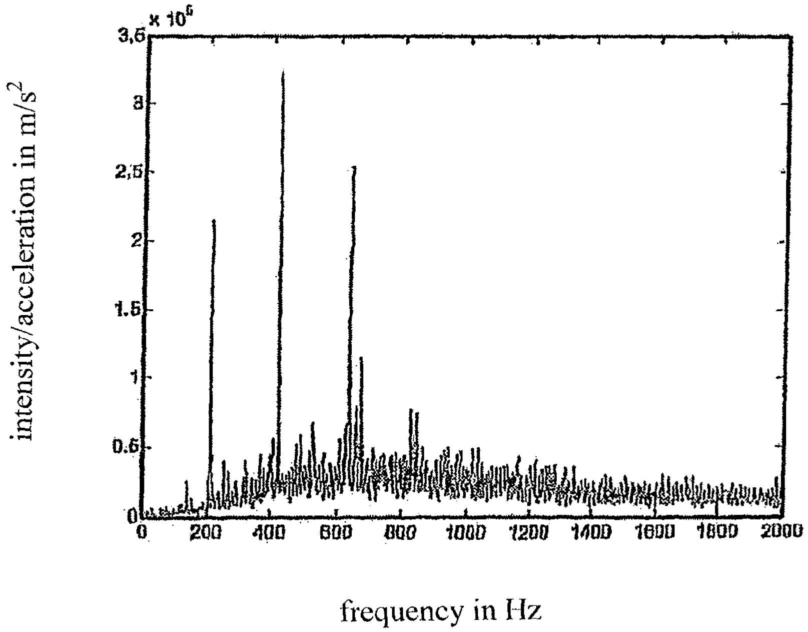
FIG. 5 is a Cepstral diagram as is produced with the method according to an embodiment of the invention.
Figure 6:
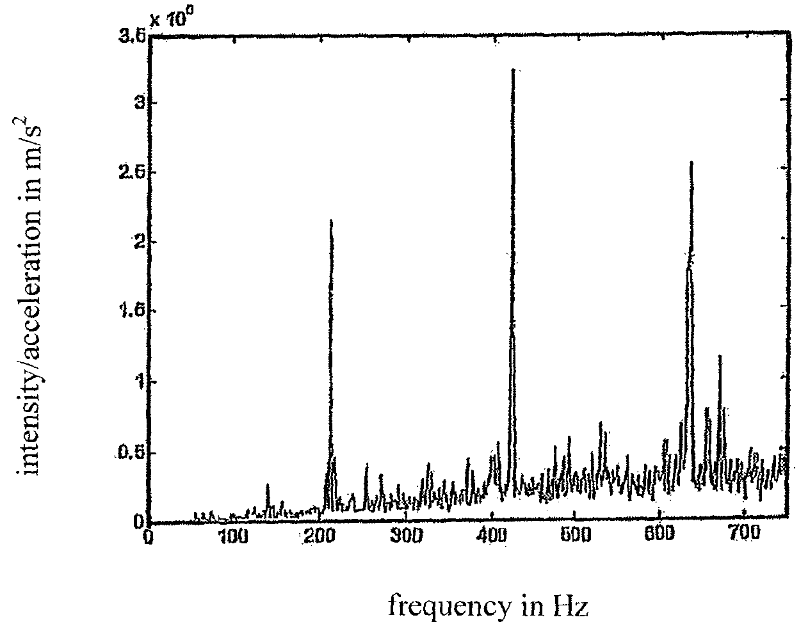
FIG. 6 is an enlarged detail of a portion of the Cepstral diagram according to FIG. 5.

The actual signal processing of the vibration signal is completed after step 4. The actual recognition of operating conditions or faults then begins in step 5. For this, in step 5, first a detail enlargement of the signal is carried out, as is represented by FIGS. 5 and 6. FIG. 5 shows a Cepstral diagram or Cepstral spectrogram (Cepstrum) as is shown in step 4 of the method. Here, one may clearly recognize that several large swings are given in the left region, the swings representing characteristic signals. Only one region, in which the characteristic signals occur, is considered for the subsequent analysis and therefore such a region is first considered as a detail, as is represented for example in FIG. 6. This detail may either be determined by where swings occur in the Cepstrum, or predefined details may be considered in which, as known, characteristic signals, in particular fault signals, are to be expected. A normalization of the Cepstrum or signal of the detail selected in FIG. 6 is carried out in step 6. This normalization serves for excluding influences of different motor variables or assembly variables. The occurring swings differ from one another depending on the size and power of the assembly. By this normalization, these swings are set in relation to the occurring background noise, which is likewise different in accordance with the power of the assembly. By the fact that the curve or the swings are set in relation to the background noise, the evaluation is independent of the current dimension of the motor or of the assembly, so that one and the same fault recognition system may be applied for differently dimensioned assemblies.

Figure 7:
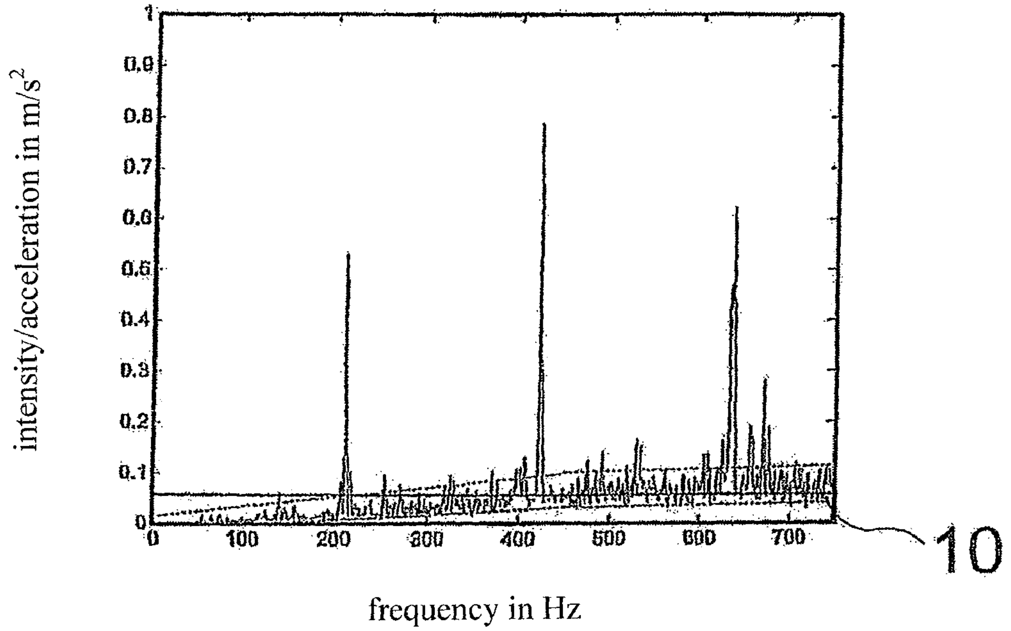
FIG. 7 is a normalized detail of the Cepstral diagram according to FIG. 6.

This is represented in FIG. 7. There, the average value of the background noise is represented as a line 10. The swings or the signals to be examined are related to this value. The actual recognition of the operating conditions or faults is then effected in step 7 by a neural network or fuzzy logic, wherein a pattern recognition takes place. The operating conditions are evaluated by the distribution of the individual swings in the Cepstral diagram. That is, here it is not a case of the absolute values of the swings, but only where or when the swings occur and in which temporal repetition frequencies. The patterns may be compared to previously stored patterns, which represent certain operating conditions, in order thus to recognize faults, for example damage to the bearings or impeller. If a fault is recognized, then this is outputted in step 8 in a suitable mariner. For this, fault signals may be transmitted to further control or regulation (closed loop control) components or the fault may be signalized acoustically or visually.

Figure 2:
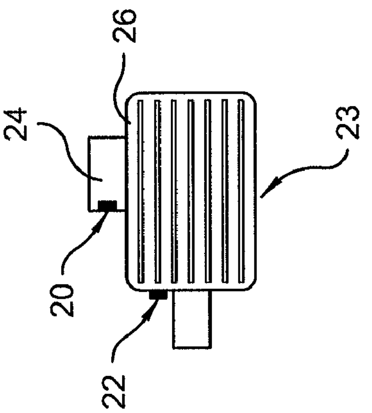
FIGS. 2, 3 and 4 are schematic views of assemblies showing possible arrangements of vibration sensors according to embodiments of the invention.

FIG. 2 shows examples of possibilities as to how a vibration sensor 20 or 22 may be arranged on the electric motor. The sensor 20 is placed in a connection box or terminal box 24, which is arranged on the motor housing 26. This arrangement is very advantageous since the sensor on the one hand is protected in the terminal box 24 and on the other hand may be arranged there in a very simple manner with further electronic components. Moreover, the cable paths are very short. The sensor 22 is arranged directly on the mechanical structure of the electric motor 23, here on the motor housing 26. The sensor 22 is preferably arranged as close as possible to the bearing of the motor shaft, in order here to particularly easily detect the vibrations or noises occurring in the bearing.

Figure 4:
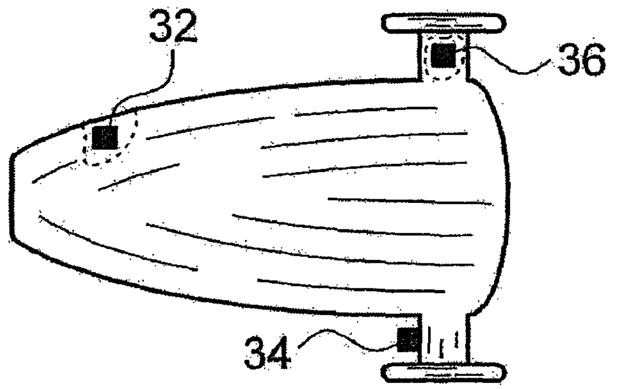
Figure 3:
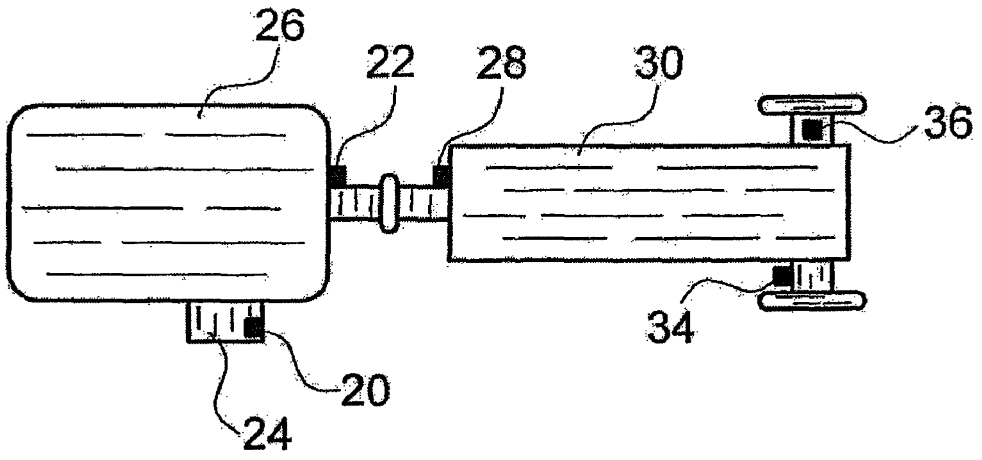

Further examples for the arrangement of a vibration sensor are shown in FIGS. 3 and 4. Thus, in accordance with the sensor 22, a sensor 28 may be arranged directly on a pump housing 30, in order here to be able to detect vibrations. Correspondingly, as shown in FIG. 4, a sensor 32 may also be integrated into the pump housing 30. Moreover, it is also possible, for example, to arrange a vibration sensor 34 on the outside on the connection union of a pump assembly. Alternatively, it is possible to arrange a sensor 36 in the connection union, i.e., in the flow, and to detect the vibrations indirectly via the fluid to be delivered.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for detecting faults in an electric motor, wherein the electric motor has at least one rotating shaft, the method comprising:

detecting a vibration signal in the electric motor, processing the detected vibration signal in a manner such that influence of a current rotational speed of the at least one rotating shaft is eliminated by multiplying a sampling frequency value by a current rotational speed value and dividing the result by a constant rotational speed value, filtering out periodic signals of the processed vibration signal, and recognizing a vibrational operating condition including any possible faults by way of the periodic signals.

2. The method according to claim 1, wherein the processed vibration signal is subjected to a Cepstral analysis and the vibrational operating condition is recognized by way of a Cepstral diagram produced by the Cepstral analysis.

3. The method according to claim 2, wherein a pattern recognition is carried out for recognizing the vibrational operating condition from the Cepstral diagram, wherein the pattern recognition particularly takes into account at which locations swings occur in the Cepstral diagram.

4. The method according to claim 2, wherein the vibrational operating condition is recognized by way of previously known patterns in the Cepstral diagram.

5. The method according to claim 2, wherein the recognition of the vibrational operating condition is effected in predefined sections of the Cepstral diagram.

6. The method according to claim 2, wherein the recognition of the vibrational operating condition is effected by way of the Cepstral diagram and by way of at least one of a neural network and fuzzy logic.

7. The method according to claim 2, wherein after the Cepstral analysis and before the recognition of the vibrational operating condition, a step of normalizing the Cepstral diagram takes place in a manner such that swings in the diagram are set in relation to background noises.

8. An electric motor, wherein the electric motor has at least one rotating shaft and a fault detection system, the fault detection system comprising:

at least one vibration sensor, an evaluation device connected to the at least one vibration sensor, wherein the evaluation device is provided with a processing module configured to eliminate influence of a current rotational speed of the at least one rotating shaft from a vibration signal captured by the at least one vibration sensor by multiplying a sampling frequency value by a current rotational speed value and dividing the result by a constant rotational speed value, a filter module configured for filtering periodic signals out of the vibration signal processed by the processing module, and a recognition module configured for recognizing a vibrational operating condition by way of the periodic signals.

9. The electric motor according to claim 8, wherein:

the filter module comprises a Cepstral analysis module that is configured for carrying out a Cepstral analysis on the vibration signal processed by the processing module, and the recognition module is configured for recognition of the vibrational operating condition by way of a Cepstral diagram produced by the Cepstral analysis module.

10. The electric motor according to claim 8, wherein the recognition module comprises at least one of a fuzzy logic and a neural network.

11. The electric motor according to claim 9, wherein:

the evaluation device comprises a memory module in which characteristic patterns of a previously stored Cepstral diagram are stored for certain operating conditions, and the recognition module is configured for recognizing the vibrational operating condition on the Cepstral diagram by way of the stored patterns.

12. The electric motor according to claim 8, wherein:

the at least one vibration sensor is arranged on a mechanical structure of the electric motor, in a terminal box, within at least one of an arrangement of electronic components and in a fluid conduit for a fluid to be delivered by a pump assembly.

13. The electric motor according to claim 8, further comprising a wireless signal transmission device for transmitting signals between the at least one vibration sensor and the evaluation device.

14. The electric motor according to claim 9, wherein the evaluation device comprises a normalization module configured for normalizing the Cepstral diagram produced by the Cepstral analysis module in such a manner that swings in the Cepstral diagram are set in relation to background noises.

15. A method for detecting faults in a pump assembly having an electric motor, wherein the pump assembly has at least one rotating shaft, the method comprising:

detecting a vibration signal in the pump or electric motor, processing the detected vibration signal in a manner such that influence of a current rotational speed of the at least one rotating shaft is eliminated by multiplying a sampling frequency value by a current rotational speed value and dividing the result by a constant rotational speed value, filtering out periodic signals of the processed vibration signal, and recognizing a vibrational operating condition including any possible faults by way of the periodic signals.

16. A pump assembly having an electric motor, wherein the pump assembly has at least one rotating shaft and a fault detection system, the fault detection system comprising:

at least one vibration sensor, an evaluation device connected to the at least one vibration sensor, wherein the evaluation device is provided with a processing module configured to eliminate influence of a current rotational speed of the at least one rotating shaft from a vibration signal captured by the at least one vibration sensor by multiplying a sampling frequency value by a current rotational speed value and dividing the result by a constant rotational speed value, a filter module configured for filtering periodic signals out of the vibration signal processed by the processing module, and a recognition module configured for recognizing a vibrational operating condition by way of the periodic signals.

* * * * *